(12) United States Patent
Chin

(10) Patent No.: US 9,438,441 B2
(45) Date of Patent: Sep. 6, 2016

(54) INTELLIGENT SWITCH CONTROL SYSTEM AND INTELLIGENT SWITCH CONTROL SYSTEM IMPLEMENTATION METHOD

(71) Applicant: Tsu-Ching Chin, Hsinchu County (TW)

(72) Inventor: Tsu-Ching Chin, Hsinchu County (TW)

( * ) Notice: Subject to any disclaimer, the term of this patent is extended or adjusted under 35 U.S.C. 154(b) by 0 days.

(21) Appl. No.: 14/980,097

(22) Filed: Dec. 28, 2015

(65) Prior Publication Data

US 2016/0204955 A1    Jul. 14, 2016

(30) Foreign Application Priority Data

Jan. 12, 2015 (TW) ................................ 104100934

(51) Int. Cl.
| | |
|---|---|
| *H04B 5/00* | (2006.01) |
| *H04L 12/28* | (2006.01) |
| *F24C 3/12* | (2006.01) |
| *H04L 29/08* | (2006.01) |
| *H04W 84/18* | (2009.01) |

(52) U.S. Cl.
CPC ........... *H04L 12/2825* (2013.01); *F24C 3/122* (2013.01); *H04L 67/10* (2013.01); *H04W 84/18* (2013.01)

(58) Field of Classification Search
USPC .......................... 455/550.1, 556.1, 41.1–41.3
See application file for complete search history.

(56) References Cited

U.S. PATENT DOCUMENTS

| | | | |
|---|---|---|---|
| 8,872,658 B2 | 10/2014 | Huang et al. | |
| 2010/0231506 A1* | 9/2010 | Pryor ................... | G01F 23/292 345/156 |
| 2012/0139719 A1* | 6/2012 | Garcia .................. | F24C 7/08 340/538 |
| 2013/0314226 A1* | 11/2013 | Zhang .................. | G08B 21/24 340/539.11 |
| 2014/0020567 A1 | 1/2014 | Lin | |
| 2014/0132418 A1* | 5/2014 | Lill ...................... | G05B 19/0428 340/679 |
| 2014/0208958 A1 | 7/2014 | Porraro | |
| 2015/0221462 A1* | 8/2015 | Chu ....................... | H01H 19/54 200/11 R |

FOREIGN PATENT DOCUMENTS

| | | |
|---|---|---|
| CN | 1494852 A | 5/2004 |
| TW | M280503 U | 11/2005 |
| TW | I439643 B | 6/2014 |
| TW | M480642 U | 6/2014 |

* cited by examiner

*Primary Examiner* — Fayyaz Alam
(74) *Attorney, Agent, or Firm* — Chun-Ming Shih; HDLS IPR Services

(57) ABSTRACT

An intelligent switch control system (10) mainly includes a mobile information apparatus (101) and a wireless control apparatus (102). The wireless control apparatus (102) is assembled and arranged in a rotary switch (201) to detect a rotation angle or a rotation position of the rotary switch (201) to monitor a usage status of an equipment (20) having the rotary switch (201). The wireless control apparatus (102) detects a switch status information and sends the switch status information to the mobile information apparatus (101), so that the user can receive an instant status by the mobile information apparatus (101) and controls the rotary switch (201) from a far-end side by the mobile information apparatus (101).

14 Claims, 11 Drawing Sheets

INTELLIGENT SWITCH CONTROL SYSTEM AND INTELLIGENT SWITCH CONTROL SYSTEM IMPLEMENTATION METHOD

BACKGROUND OF THE INVENTION

1. Field of the Invention

An intelligent switch control system and an intelligent switch control system implementation method are applied to monitor a usage status of an equipment which has a rotary switch. The intelligent switch control system and the intelligent switch control system implementation method mainly detect a three-axis variation of the rotary switch. The usage status of the equipment is determined by a rotational position of the rotary switch, so that the equipment is monitored and controlled from a far-end side.

2. Description of the Related Art

According to the statistical result, the kitchen in the house is the place that the fire breaks out most often. The main reason is that usually at least one fire equipment is arranged in the kitchen. If the fire equipment is not used properly, the fire breaks out easily. According to the experiences of the fire in the kitchen, the main reason of the fire is that the user goes out but not turns off or forgets to turn off the fire equipment. Therefore, some products that may detect the fire in the kitchen and alert the user are provided to avoid the fire breaking out. Please refer to patent number M480642 of the Republic of China. M480642 discloses a distance alarm system which comprises a wireless transceiver and an electronic apparatus. The wireless transceiver transmits a plurality of wireless signals and is arranged in a gas stove. The electronic apparatus comprises a signal transceiver module, a storage module, a processing module and an alarm module. The processing module is coupled to the signal transceiver module, the alarm module and the storage module respectively. The signal transceiver module receives a plurality of wireless signals. The storage module stores signal sensing application programs. When the processing module receives a plurality of wireless signals, the processing module runs the signal sensing application programs to generate a signal strength value. Therefore, if the signal strength value of the wireless signal of the electronic apparatus continues to be less than a predetermined strength value, the alarm module of the electronic apparatus will send out an alarm signal to alarm the user that the distance between the user and the gas stove is too long. Moreover, other related arts are listed for reference as following:

1. The patent number I439643 of the Republic of China: Wireless network safety gas stove.
2. The patent number M280503 of the Republic of China: Apparatus for running recipe programs by induction cooker.
3. The patent number CN1494852 of the People's Republic of China: Automatic cooking machine and its adjusting system for cooking gas and flame.
4. The patent number U.S. Pat. No. 8,872,658 of the United States: Service method of gas appliances.
5. The patent number US20140208958 of the United States: Accessory for indicating status of stove burner.
6. The patent number US20140020567 of the United States: Stove and method for preventing cooked material from being burnt dry.

However, it is known from the related art mentioned above that the distance alarm system utilizes the signal strength value between the electronic apparatus and each of the signal transceiver modules as the trigger condition of the alarm module of the electronic apparatus to alarm the user about the safety of the fire equipment. However, the signal strength of each of the signal transceiver modules is impacted by the environment, the signal-receiving components of the electronic apparatus and the signal transceiver module. If it is determined by the signal strength value, the alarm effect will not be perfect, and there will be a safety risk for using the fire equipment. Moreover, if the user receives the alarm signal but the user cannot operate the fire equipment from the far-end side, there will still be a safety risk for using the fire equipment. This problem needs to be resolved.

SUMMARY OF THE INVENTION

In order to solve the problem mentioned above, the inventor utilizes the working and product design experiences for years to find out that the electronic apparatus or the fire equipment are often operated by using the rotary switch. Therefore, the inventor does research and analysis on the detection and control for the rotary switch, and hopes to design a switch control system for monitoring the rotary switch. Therefore, the main object of the present invention is to provide an intelligent switch control system and an intelligent switch control system implementation method to monitor and control the rotary switch from the far-end side by using the mobile information apparatus.

In order to achieve the object mentioned above, the intelligent switch control system of the present invention mainly comprises a mobile information apparatus and a wireless control apparatus. The mobile information apparatus is informationally (wirelessly) connected to the wireless control apparatus, so that the mobile information apparatus and the wireless control apparatus form a connection status. The wireless control apparatus is arranged in a rotary switch to detect a rotation angle or a rotation position of the rotary switch. In the connection status, the wireless control apparatus detects a three-axis variation information and sends the three-axis variation information to the mobile information apparatus, so that the mobile information apparatus determines a usage status of the rotary switch by the three-axis variation information. The user obtains the usage status of the rotary switch by the mobile information apparatus. When the user who takes the mobile information apparatus goes away from the rotary switch so the mobile information apparatus and the wireless control apparatus are in a disconnection status, the mobile information apparatus determines whether the rotary switch is turned off or not by a latest of the three-axis variation information. If the rotary switch is not turned off, the mobile information apparatus informs the user that the rotary switch is not turned off. Moreover, the wireless control apparatus can be controlled by the mobile information apparatus from a far-end side to improve an operation of the rotary switch.

In order to let the examiner clearly understands the objects, the technical features and the advantages of the present invention, please refer to following descriptions and figures.

DETAILED DESCRIPTION OF THE INVENTION

Figure 1:
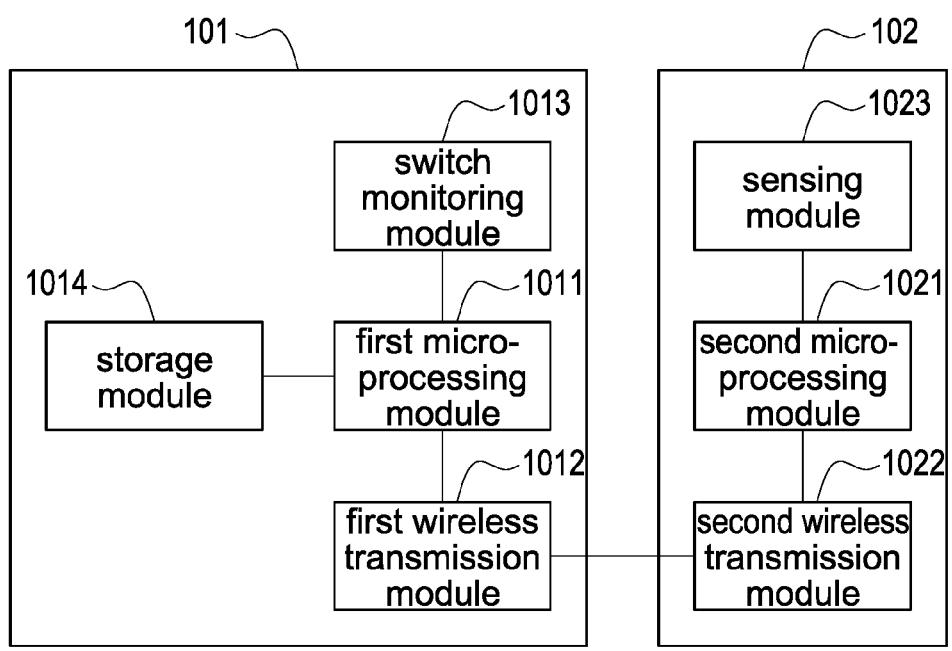
FIG. 1 shows a block diagram of the intelligent switch control system of the present invention.

FIG. 1 shows a block diagram of the intelligent switch control system of the present invention. As shown in FIG. 1, the intelligent switch control system 10 mainly comprises a mobile information apparatus 101 and a wireless control apparatus 102. The mobile information apparatus 101 can be a smart phone, a PDA or a tablet computer, etc. The mobile information apparatus 101 comprises a first micro-processing module 1011, and further comprises a first wireless transmission module 1012, a switch monitoring module 1013 and a storage module 1014 which are informationally (electrically) connected to the first micro-processing module 1011. The first micro-processing module 1011 can be a microprocessor control unit (MCU) for transmitting electrical signals received by the first wireless transmission module 1012. The first wireless transmission module 1012 has wireless fidelity (WI-FI), Bluetooth or infrared ray (IR) transmission technology for receiving and transmitting the electrical signals. The switch monitoring module 1013 analyzes a switch status information transmitted from the wireless control apparatus 102, so that the mobile information apparatus 101 monitors and controls the wireless control apparatus 102. The storage module 1014 stores the switch status information which has been analyzed by the switch monitoring module 1013. Moreover, the wireless control apparatus 102 comprises a second micro-processing module 1021, and further comprises a second wireless transmission module 1022 and a sensing module 1023 which are informationally (electrically) connected to the second micro-processing module 1021 respectively. The second micro-processing module 1021 can control the sensing module 1023 and can be a microprocessor control unit (MCU), a central processing unit (CPU), a microprocessor unit (MPU) or a digital signal processing (DSP). The second wireless transmission module 1022 can be informationally (wirelessly) connected to the first wireless transmission module 1012, so that the mobile information apparatus 101 and the wireless control apparatus 102 form a connection status. The second wireless transmission module 1022 transmits digital information to the mobile information apparatus 101, or receives digital information transmitted from the mobile information apparatus 101. The second wireless transmission module 1022 has wireless fidelity (WI-FI), Bluetooth or infrared ray (IR) transmission technology etc. The sensing module 1023 senses a three-axis variation or a displacement variation of the wireless control apparatus 102. The sensing module 1023 can be one of a gravity sensor (G-sensor), a digital three-axis angle meter, a three-axis gyroscope and an electronic compass, or can be a combination of a gravity sensor (G-sensor), a digital three-axis angle meter, a three-axis gyroscope and an electronic compass.

Figure 2:
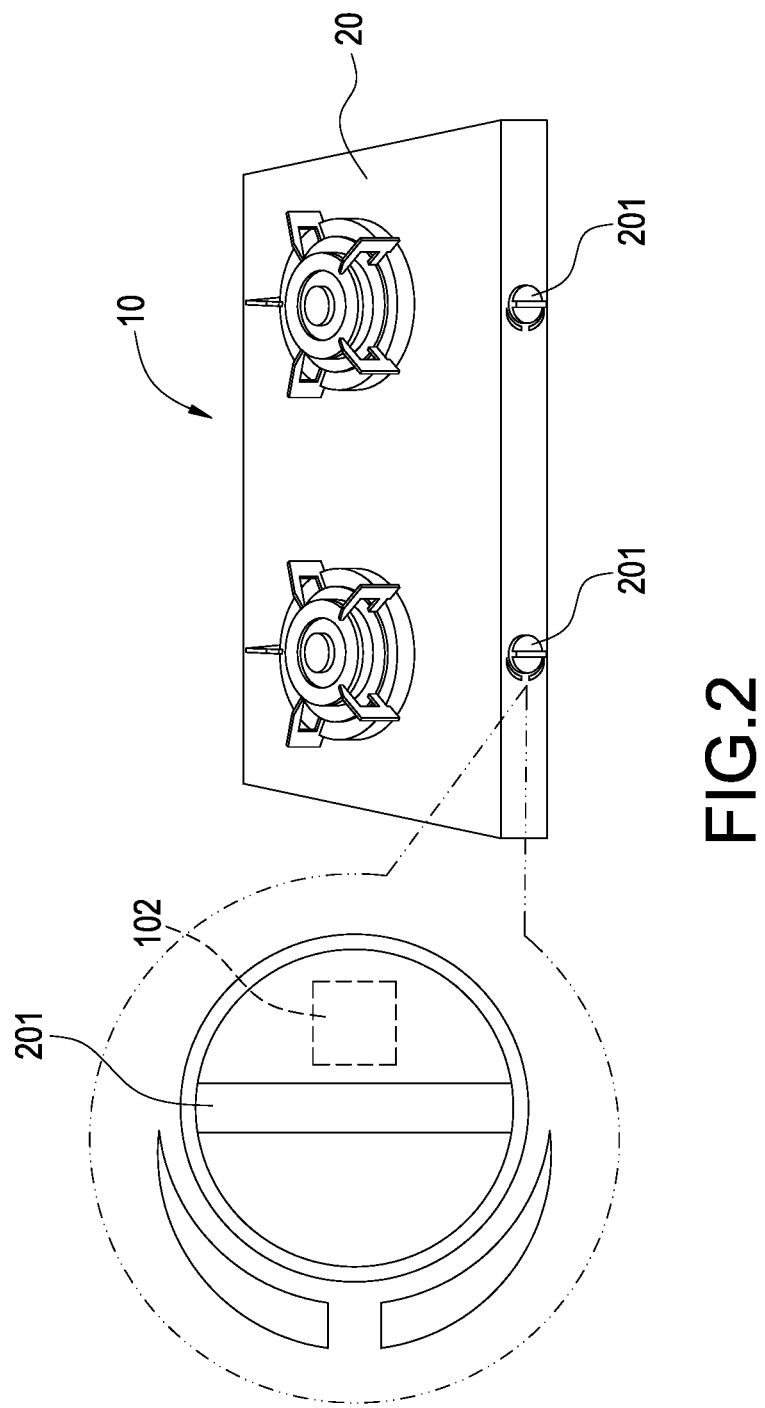
FIG. 2 shows an assembly drawing of the intelligent switch control system of the present invention.

FIG. 2 shows an assembly drawing of the intelligent switch control system of the present invention. Please refer to FIG. 1 at the same time. The intelligent switch control system 10 of the present invention can monitor the three-axis variation of an equipment having a rotary switch. The equipment can be an electric heater equipment, a fire equipment or a gas safety valve, etc. Please refer to FIG. 2 again. In this embodiment, the present invention is applied to a fire equipment to monitor and control a status of the rotary switch of the fire equipment. As shown in FIG. 2, the wireless control apparatus 102 of the intelligent switch control system 10 is arranged in a rotary switch 201 of a fire equipment 20, so that the wireless control apparatus 102 can sense the three-axis variation of the rotary switch 201 and transmit the three-axis variation to the mobile information apparatus 101. According to the three-axis variation of the rotary switch 201, the mobile information apparatus 101 determines an instant usage status of the fire equipment 20. The embodiment takes the fire equipment as an example but the present invention is not limited to it. Namely, the present invention can be applied to any equipment having the rotary switch.

Figure 3:
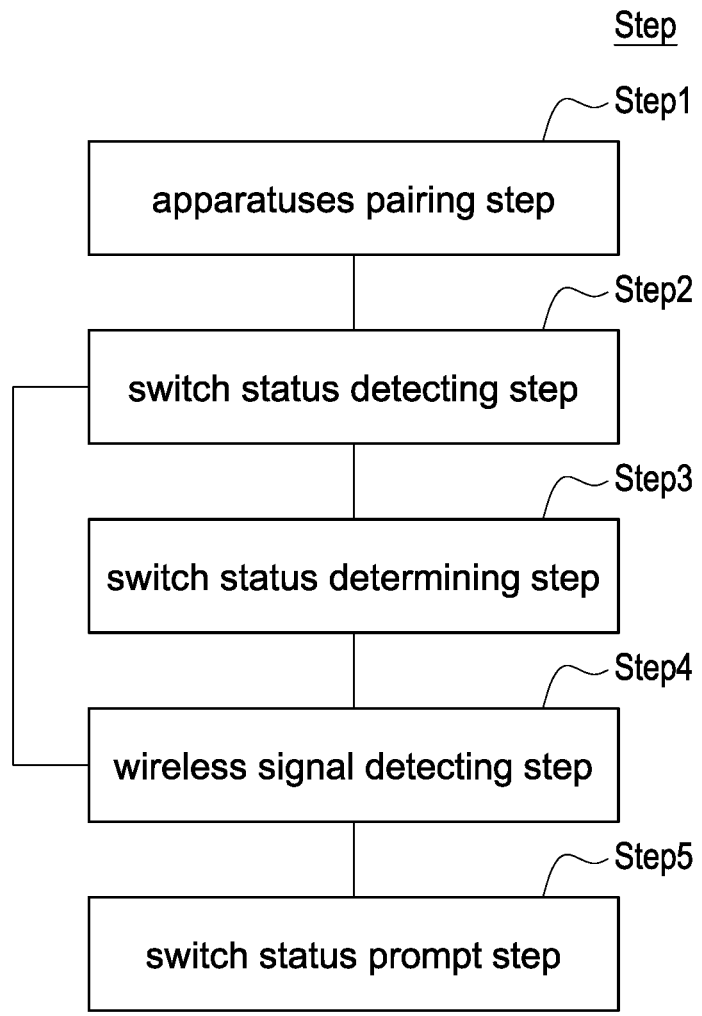
FIG. 3 shows a flow chart of the intelligent switch control system implementation method of the present invention.

FIG. 3 shows a flow chart of the intelligent switch control system implementation method of the present invention. As shown in FIG. 3, please refer to FIG. 1 and FIG. 2 at the same time. The intelligent switch control system implementation method comprises following steps.

Figure 4:
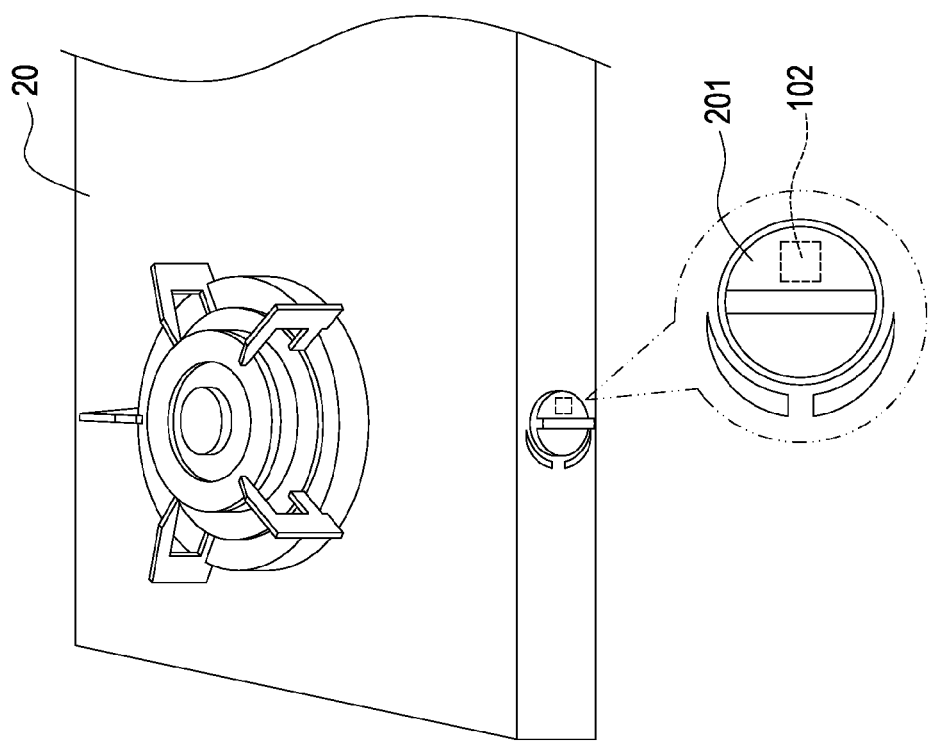
FIG. 4 shows a diagram of an embodiment (1) of the present invention.
Figure 4:
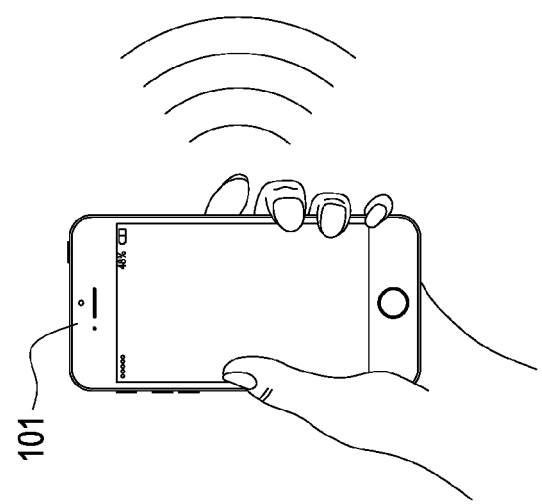

(1) Apparatuses pairing step Step1: FIG. 4 shows a diagram of an embodiment (1) of the present invention. As shown in FIG. 4, the switch monitoring module 1013 of the mobile information apparatus 101 is executed, so that the first wireless transmission module 1012 of the mobile information apparatus 101 is informationally (wirelessly) connected to the second wireless transmission module 1022 of the wireless control apparatus 102 to form the connection status in a signal receiving range. The signal receiving range is an effective range for the first wireless transmission module 1012 being informationally connected to the second wireless transmission module 1022. If the first wireless transmission module 1012 is informationally connected to the second wireless transmission module 1022 by Bluetooth transmission method, the signal receiving range is an effective receiving range (30~100 meters) of Bluetooth transmission modules. Moreover, when the mobile information apparatus 101 is informationally connected to the wireless control apparatus 102, the wireless control apparatus 102 can further identify the mobile information apparatus 101, so that the wireless control apparatus 102 can be wirelessly connected to the mobile information apparatus 101 which is specific. When the mobile information apparatus 101 is informationally connected to the wireless control apparatus 102, the mobile information apparatus 101 can transmit an identification signal with an apparatus identification information (for example, the International Mobile Equipment Identity, IMEI) to the second wireless transmission module 1022 of the wireless control apparatus 102. After the wireless control apparatus 102 receives the identification signal, the wireless control apparatus 102 compares and checks the identification signal to determine whether the mobile information apparatus 101 transmitting the identification signal is the mobile information apparatus 101 which is specific or not. If the identification signal is compared and checked to show that the mobile information apparatus 101 transmitting the identification signal is the mobile information apparatus 101 which is specific, the wireless control apparatus 102 will be informationally connected to the mobile information apparatus 101 to avoid incorrectly connecting to other apparatuses.

(2) Switch status detecting step Step2: To continue above step, when the mobile information apparatus 101 has been informationally connected to the wireless control apparatus 102, the second micro-processing module 1021 of the wireless control apparatus 102 drives the sensing module 1023, so that the sensing module 1023 starts to detect the three-axis variation of the rotary switch 201 of the fire equipment 20 and generate a three-axis variation information. After the second micro-processing module 1021 receives the three-axis variation information, the second micro-processing module 1021 transmits the three-axis variation information to the first wireless transmission module 1012 of the mobile information apparatus 101 through the second wireless transmission module 1022.

Figure 5:
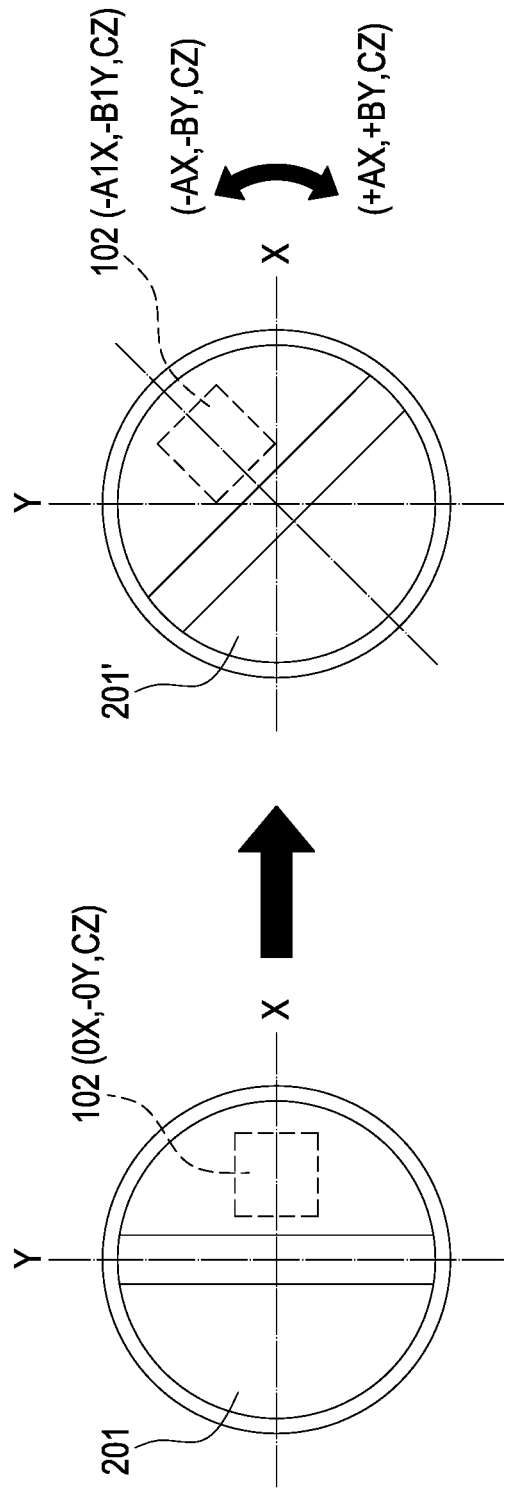
FIG. 5 shows a diagram of an embodiment (2) of the present invention.

(3) Switch status determining step Step3: To continue above step, FIG. 5 shows a diagram of an embodiment (2) of the present invention. As shown in FIG. 5, when the mobile information apparatus 101 receives the three-axis variation information, the first micro-processing module 1011 of the mobile information apparatus 101 transmits the three-axis variation information to the switch monitoring module 1013. Moreover, after the switch monitoring module 1013 receives a first of the three-axis variation information, according to the three-axis variation information, the switch monitoring module 1013 proceeds with a calibration procedure for the sensing module 1023. The calibration procedure mentioned above can be that, for example, when the rotary switch 201 is in a turned-off status, the switch monitoring module 1013 calibrates an initial three-axis vector position of the rotary switch 201 as (0X, 0Y, 0Z). Moreover, when the rotary switch 201 is rotated, the three-axis variation (namely the rotation angle or position) of the rotary switch 201 can be defined to recognize the status, such as the flame strength. Therefore, in the calibration procedure, the rotary switch 201 can be adjusted to each status in order (for example, the flame strength from low to high), and then the sensing module 1023 transmits the three-axis variation information of each status to the mobile information apparatus 101 in order, so that the mobile information apparatus 101 can accurately monitor and control the rotation angle or the rotation position of the rotary switch 201. For example, when the rotary switch 201 is rotated from the "low flame" to the "high flame", the three-axis variation information can be changed, for example but not limited to, from (−1X, −1Y, −1Z) to (−30X, −30Y, −4Z). Moreover, after the switch monitoring module 1013 receives the three-axis variation information, the switch monitoring module 1013 analyzes the three-axis variation information instantly to obtain a switch status information, and stores the switch status information into the storage module 1014. Moreover, the wireless control apparatus 102 continues to transmit the three-axis variation information which is detected to the mobile information apparatus 101, so that the mobile information apparatus 101 updates the switch status information instantly. Moreover, the switch status information mentioned above comprises a turn-on status and a turned-off status. Moreover, in the left side of FIG. 5, when the rotary switch 201 is in the turned-off status, the three-axis variation information of the rotary switch 201 is (0X, 0Y, CZ). Please refer to FIG. 5 again. When a rotary switch 201' is in the turn-on status, the three-axis variation information is (−A1X, −B1Y, CZ), wherein the A, B and C are variables. If the rotary switch 201 (or the rotary switch 201') is rotated to the left, the three-axis variation information of the rotary switch 201 (or the rotary switch 201') is (−AX, −BY, CZ). If the rotary switch 201 (or the rotary switch 201') is rotated to the right, the three-axis variation information of the rotary switch 201 (or the rotary switch 201') is (+AX, +BY, CZ). The three-axis variation information mentioned above is just for reference but the present invention is not limited to it. The three-axis variation information can be adjusted according to the actual data detected by the sensing module 1023. Moreover, in fact, the value of the Z-axis of the three-axis variation information will be changed according to the position of the arrangement of the rotary switch 201. For example, when the rotary switch 201 is in the turned-off status, the three-axis variation information of the rotary switch 201 can be (0X, 0Y, +CZ) or (0X, 0Y, −CZ) but the present invention is not limited to it.

(4) Wireless signal detecting step Step4: To continue above step, the mobile information apparatus 101 continues to receive the three-axis variation information transmitted from the wireless control apparatus 102. At the same time, the mobile information apparatus 101 detects the connection status with the wireless control apparatus 102. When the user who takes the mobile information apparatus 101 is in the signal receiving range of the mobile information apparatus 101 and the wireless control apparatus 102, the intelligent switch control system 10 repeats the switch status detecting step Step2 and the switch status determining step Step3, so that the mobile information apparatus 101 continues to update the switch status information. When the user who takes the mobile information apparatus 101 leaves the signal receiving range, the method goes to next step.

Figure 6:
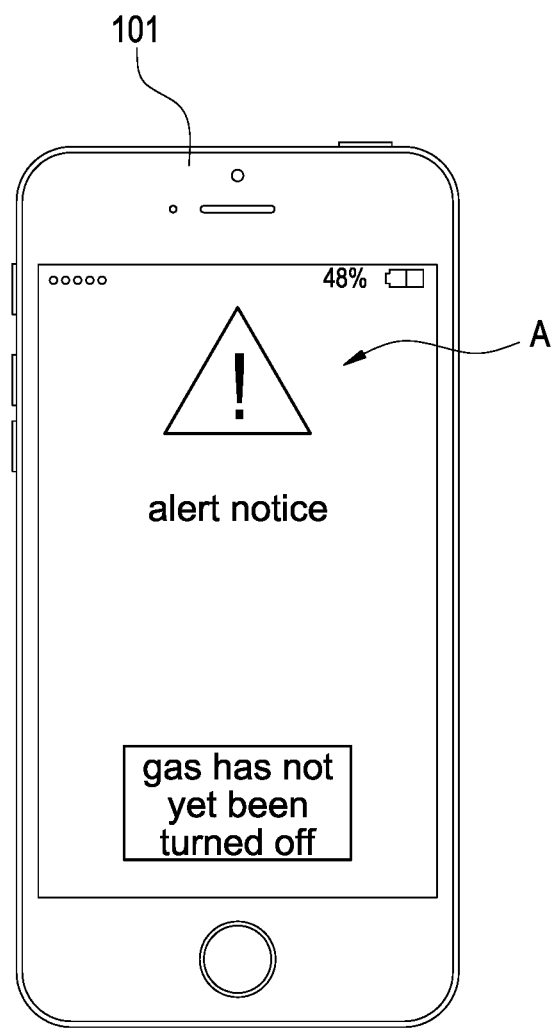
FIG. 6 shows a diagram of an embodiment (3) of the present invention.

(5) Switch status prompt step Stpe5: To continue above step, when the mobile information apparatus 101 cannot detect the wireless control apparatus 102, the mobile information apparatus 101 and the wireless control apparatus 102 form a dis-connection status. At this time, the mobile information apparatus 101 will fetch the latest of the switch status information stored in the storage module 1014. When the latest of the switch status information is in the turned-off status, the mobile information apparatus 101 will continue detect the wireless control apparatus 102 until the user who takes the mobile information apparatus 101 enters the signal receiving range so the mobile information apparatus 101 is re-connected to the wireless control apparatus 102. FIG. 6 shows a diagram of an embodiment (3) of the present invention. As shown in FIG. 6, when the latest of the switch status information is in the turned-on status, the switch monitoring module 1013 will inform the mobile information apparatus 101 to send out an alert prompt A to alert the user that the fire equipment has to be turned off for safety. Moreover, the alert prompt A mentioned above is, for example but not limited to, a text message, a voice message, an alert sound or a vibration alert.

Figure 7:
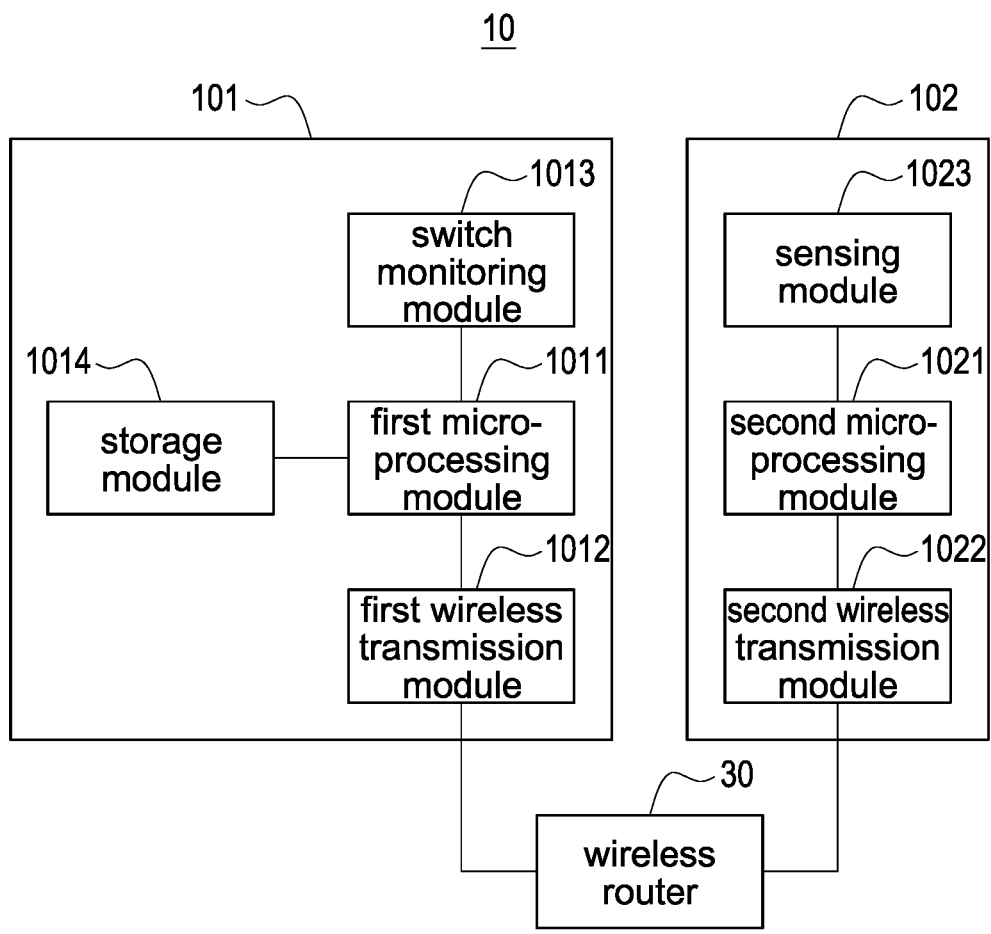
FIG. 7 shows a diagram of another embodiment (1) of the present invention.

FIG. 7 shows a diagram of another embodiment (1) of the present invention. As shown in FIG. 7, the signal receiving range of the first wireless transmission module 1012 and the second wireless transmission module 1022 can be extended according to the requirement by a wireless router 30 as shown in FIG. 7. The first wireless transmission module 1012 and the second wireless transmission module 1022 are informationally connected to the wireless router 30 respectively. The first wireless transmission module 1012 can transmit signals to (namely, communicates with) the second wireless transmission module 1022 through the wireless router 30. Therefore, the signal receiving range of the first wireless transmission module 1012 and the second wireless transmission module 1022 is extended.

Figure 8:
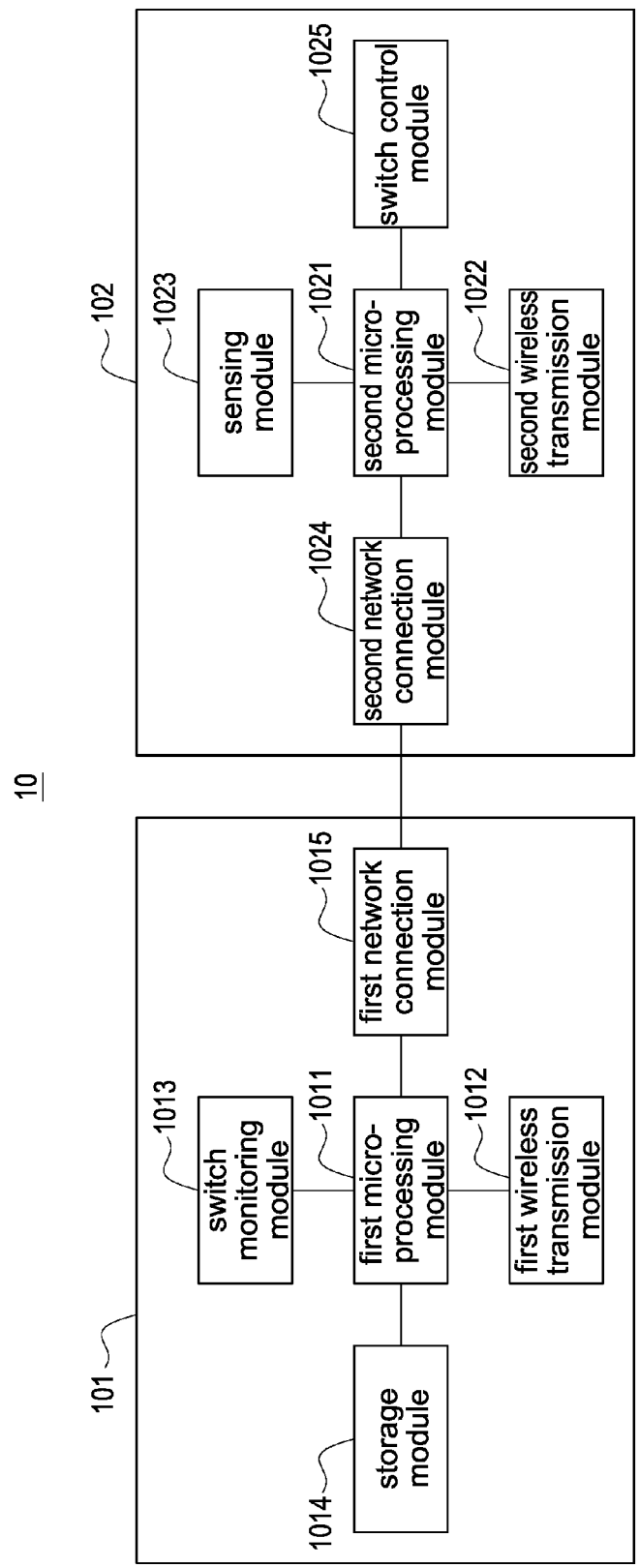
FIG. 8 shows a diagram of another embodiment (2) of the present invention.
Figure 9:
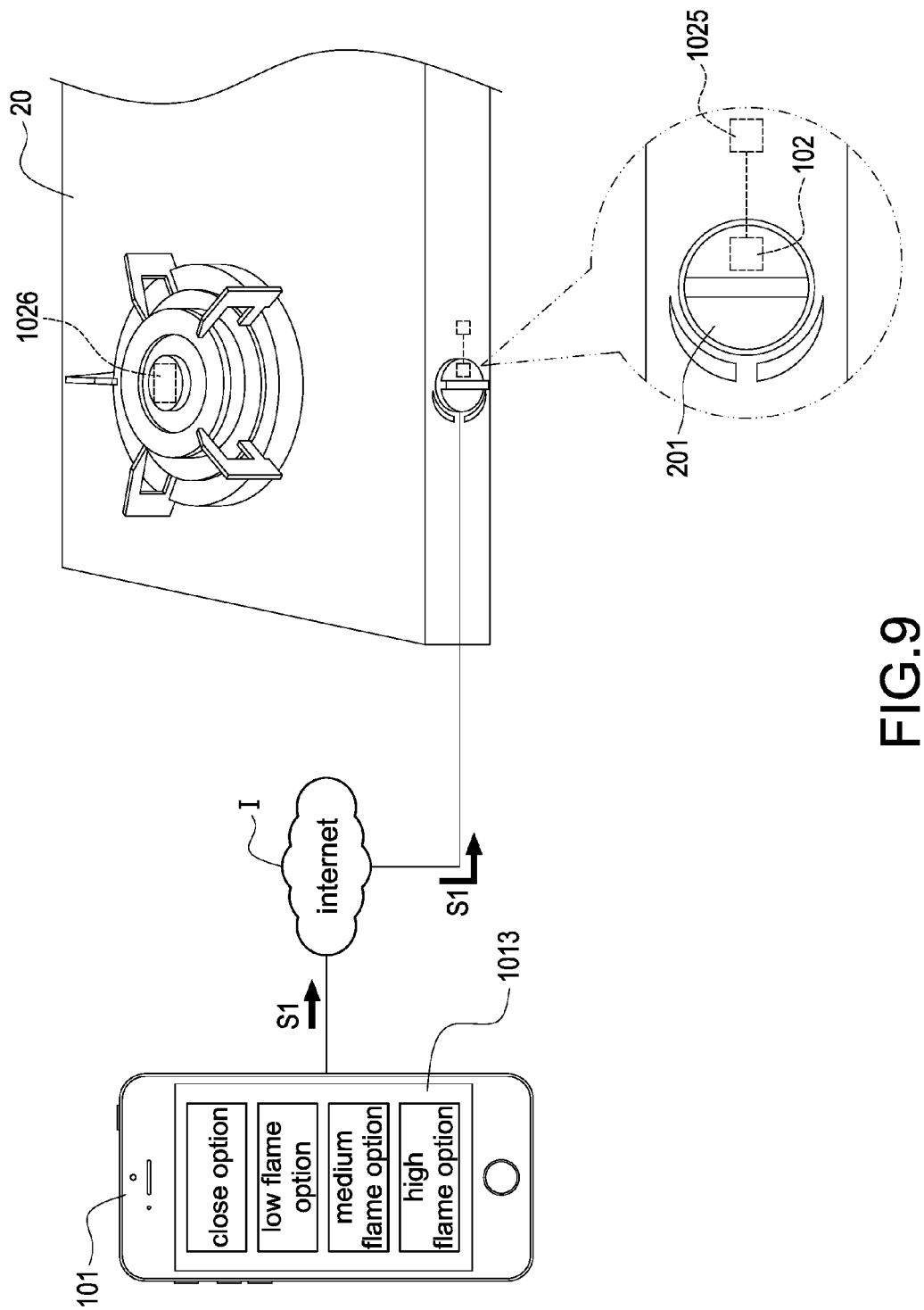
FIG. 9 shows an implementation diagram of another embodiment (2) of the present invention.

FIG. 8 shows a diagram of another embodiment (2) of the present invention. Please refer to FIG. 1 as well. As shown in FIG. 8, the mobile information apparatus 101 further comprises a first network connection module 1015 informationally connected to the first micro-processing module 1011. The first network connection module 1015 is used to connect to the Internet by wireless fidelity (WI-FI) or the mobile communication technology etc. Moreover, the wireless control apparatus 102 further comprises a second network connection module 1024 informationally connected to the second micro-processing module 1021. The second network connection module 1024 is used to connect to the Internet. Moreover, first network connection module 1015 can be informationally connected to the second network connection module 1024 through the Internet. Please refer to FIG. 8 again. The wireless control apparatus 102 further comprises a switch control module 1025 informationally connected to the second micro-processing module 1021. The switch control module 1025 can be used to adjust the three-axis variation of the rotary switch 201 of the fire equipment 20. The switch control module 1025 is, for example but not limited to, a stepping motor, a servo motor or a linear motor etc. Moreover, the switch monitoring module 1013 of the mobile information apparatus 101 wirelessly controls the switch control module 1025. Moreover, the switch monitoring module 1013 further comprises a plurality of flame strength adjustment options (for examples, a close option, a low flame option, a medium flame option and a high flame option), so that the user can operate and choose by the mobile information apparatus 101. FIG. 9 shows an implementation diagram of another embodiment (2) of the present invention. As shown in FIG. 9, when the wireless control apparatus 102 is assembled, the switch control module 1025 is assembled and arranged with the rotary switch 201 of the fire equipment 20, so that the switch control module 1025 interacts with (or controls) the rotary switch 201 to adjust the rotation angle or the rotation position of the rotary switch 201. In an embodiment, if the user who takes the mobile information apparatus 101 is in the signal receiving range and chooses the low flame option of the flame strength adjustment options by the switch monitoring module 1013 of the mobile information apparatus 101, the switch monitoring module 1013 generates a switch adjusting signal S1 and sends the switch adjusting signal S1 to the second wireless transmission module 1022 of the wireless control apparatus 102 through the first wireless transmission module 1012. Moreover, after the second wireless transmission module 1022 receives the switch adjusting signal S1, the second wireless transmission module 1022 sends the switch adjusting signal S1 to the second micro-processing module 1021, so that the second micro-processing module 1021 adjusts the three-axis variation of the switch control module 1025 according to the adjustment requirement of the switch adjusting signal S1. For example, when the switch adjusting signal S1 is the low flame option, the switch control module 1025 will rotate the rotary switch 201, so that the rotary switch 201 is rotated between 0~60 degrees. When the switch adjusting signal S1 is the medium flame option, the switch control module 1025 will rotate the rotary switch 201, so that the rotary switch 201 is rotated between 60~120 degrees. When the switch adjusting signal S1 is the high flame option, the switch control module 1025 will rotate the rotary switch 201, so that the rotary switch 201 is rotated between 120~180 degrees. Moreover, the three-axis variation of the rotary switch 201 can be, for example but not limited to, adjusted by the rotation angle of the rotary switch 201. Moreover, if the user is not in the signal receiving range, the mobile information apparatus 101 can send the switch adjusting signal S1 to the second network connection module 1024 of the wireless control apparatus 102 through an internet I by the first network connection module 1015, so that the wireless control apparatus 102 can still receive the operating signals sent from the mobile information apparatus 101 out of the signal receiving range. Please refer to FIG. 9 again. The wireless control apparatus 102 further comprises a temperature sensing module 1026 (which can sense an ambient temperature) assembled and arranged with the fire equipment 20 and informationally connected to the second micro-processing module 1021 of the wireless control apparatus 102 and sensing the instant temperature of the fire equipment 20. In an embodiment, after the fire equipment 20 is turned on, the temperature sensing module 1026 will sense the temperature of the fire equipment 20 and then generates a temperature information and sends the temperature information to the wireless control apparatus 102, so that the wireless control apparatus 102 can send the temperature information to the mobile information apparatus 101, and the user can see the instant temperature of the fire equipment 20 on the mobile information apparatus 101.

Figure 10:
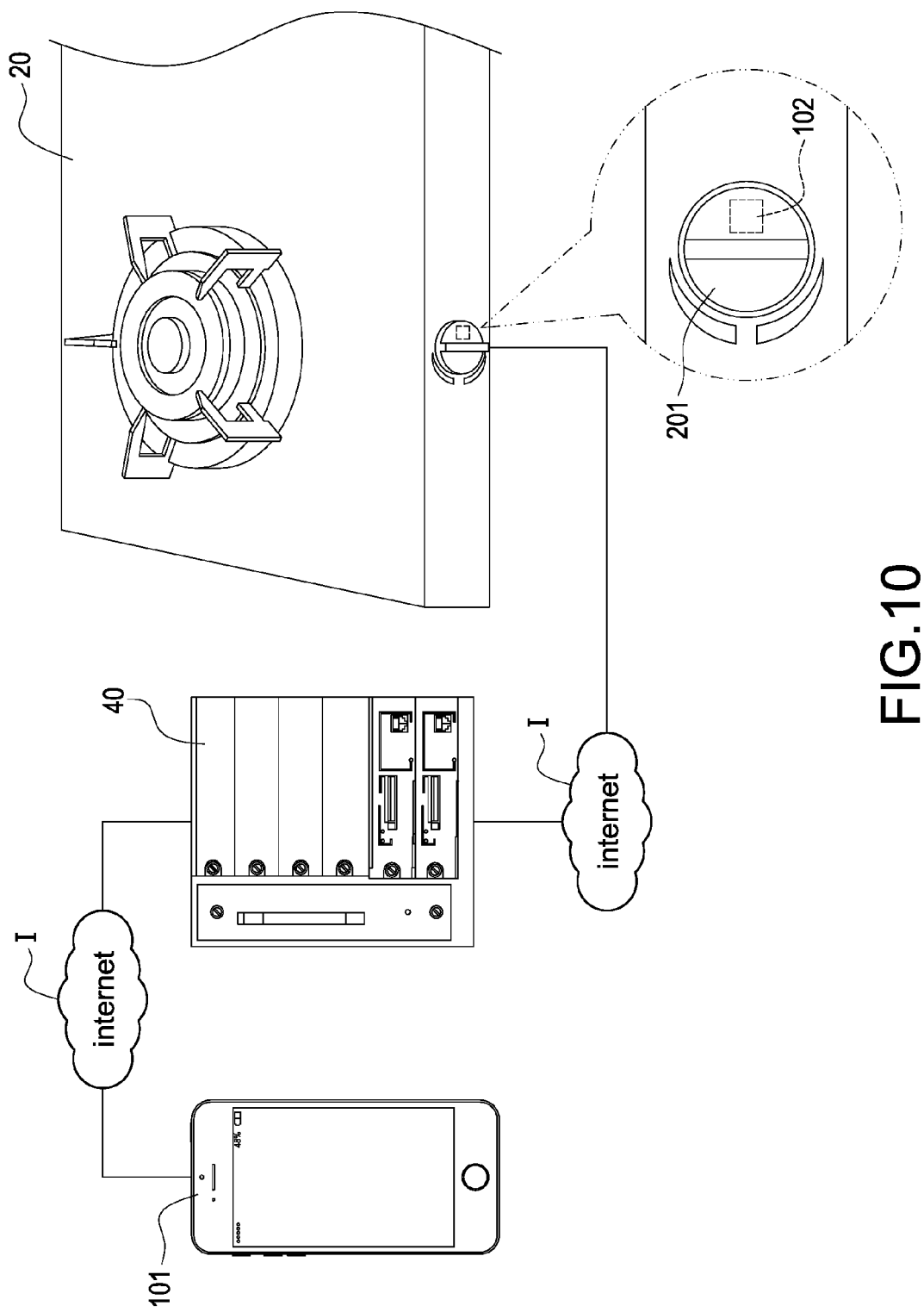
FIG. 10 shows a diagram of another embodiment (3) of the present invention.

FIG. 10 shows a diagram of another embodiment (3) of the present invention. As shown in FIG. 10, the mobile information apparatus 101 and the wireless control apparatus 102 are connected to a server 40 through the internet I respectively. The wireless control apparatus 102 can upload the three-axis variation information or the temperature information to the server 40 to store in the server 40. If the user who takes the mobile information apparatus 101 is out of the signal receiving range, the mobile information apparatus 101 can be informationally connected to the server 40 to fetch the three-axis variation information or the temperature information stored in the server 40.

Figure 11:
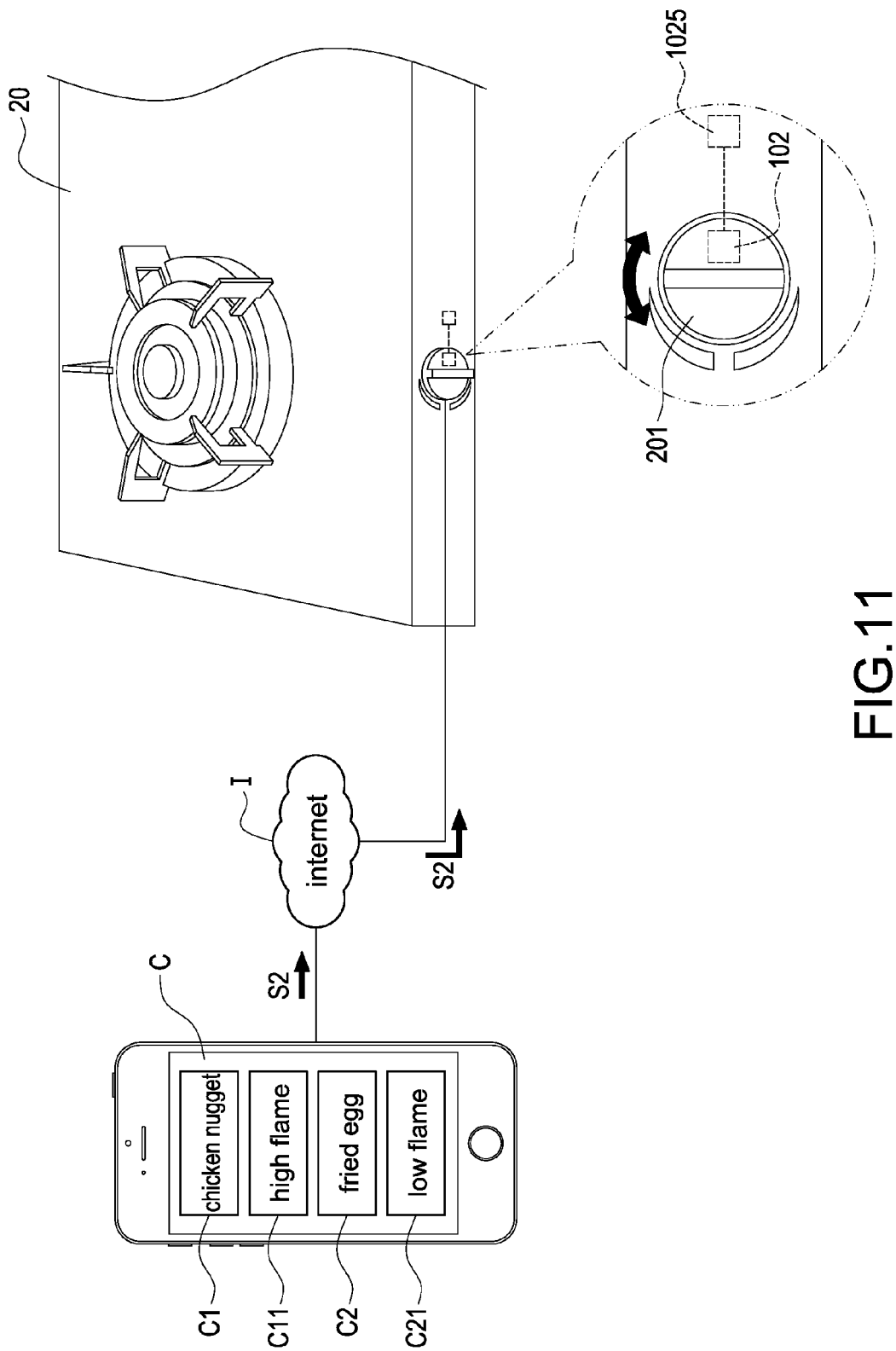
FIG. 11 shows a diagram of another embodiment (4) of the present invention.

FIG. 11 shows a diagram of another embodiment (4) of the present invention. As shown in FIG. 11, the mobile information apparatus 101 further comprises a recipe data menu C stored in the storage module 1014. The recipe data menu C comprises a plurality of recipe options (for examples, a recipe option C1 and a recipe option C2 etc.). Moreover, the recipe data menu C can be downloaded from the Internet or the user inputs the recipe data menu C, so that the recipe options (C1, C2 . . . ) of the recipe data menu C are updated. Moreover, each of the recipe options (C1, C2 . . . ) has a different fire suggestive value (for examples, a fire suggestive value C11 and a fire suggestive value C21 etc.). When the user turns on the recipe data menu C by the switch monitoring module 1013 and chooses the recipe option Cl, the switch monitoring module 1013 will analyze the fire suggestive value C11 of the recipe option Cl to generate a switch adjusting signal S2 in accordance with the fire suggestive value C11. The switch monitoring module 1013 sends the switch adjusting signal S2 to the wireless control apparatus 102, so that the switch control module 1025 adjusts the rotation angle or the rotation position of the rotary switch 201 and then the flame strength of the fire equipment 20 is adjusted as the fire suggestive value C11. Therefore, when the user is cooking, the mobile information apparatus 101 can adjust the flame strength from the far-end side. The flame strength is adjusted in accordance with the recipe options (C1, C2 . . . ), so that the user does not need to adjust the flame strength by rotating the rotary switch 201 with the user's hand, and the food can be cooked with the most suitable flame strength.

From the contents mentioned above, the intelligent switch control system of the present invention mainly comprises a mobile information apparatus and a wireless control apparatus. The wireless control apparatus is assembled and arranged in a rotary switch. A sensing module of the wireless control apparatus senses a three-axis variation of the rotary switch and converts an angle information which is detected into a three-axis variation information. When the user who takes the mobile information apparatus is in the signal receiving range, a switch control module of the mobile information apparatus is executed, so that the mobile information apparatus and the wireless control apparatus finish the information connection and form the connection status. The wireless control apparatus transmits the three-axis variation information to the mobile information apparatus. Moreover, the switch monitoring module of the mobile information apparatus analyzes the three-axis variation information to generate a switch status information. The switch status information comprises a turned-on status and a turned-off status. If the user who takes the mobile information apparatus is out of the signal receiving range and the switch monitoring module analyzes that the rotary switch is turned on (in the turned-on status), the switch monitoring module sends out an alert prompt on the mobile information apparatus. Moreover, the wireless control apparatus further comprises a switch control module. The switch monitoring module of the mobile information apparatus sends a switch adjusting signal to the wireless control apparatus through the Internet, so that the switch control module of the wireless control apparatus adjusts the rotation angle or the rotation position of the rotary switch. Furthermore, the equipment (for example, the fire equipment) can be turned off from the far-end side. Therefore, the present invention provides the intelligent switch control system and intelligent switch control system implementation method that intelligently monitor and control (namely, adjust) the rotary switch by the mobile information apparatus from the far-end side.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An intelligent switch control system for monitoring a usage status of an equipment, the intelligent switch control system comprising:
a mobile information apparatus comprising a first micro-processing module, and further comprising a first wireless transmission module and a switch monitoring module informationally connected to the first micro-processing module; and a wireless control apparatus assembled and arranged in a rotary switch of the equipment, the wireless control apparatus informationally connected to the mobile information apparatus in a signal receiving range, the wireless control apparatus comprising a second micro-processing module, and further comprising a sensing module and a second wireless transmission module informationally connected to the second micro-processing module, the sensing module detecting a three-axis variation information of the rotary switch, wherein the wireless control apparatus sends the three-axis variation information to the mobile information apparatus to analyze, so that the switch monitoring module analyzes the three-axis variation information to generate a switch status information; when the mobile information apparatus is out of the signal receiving range and the switch status information is a turned-on status, the switch monitoring module displays an alert prompt on the mobile information apparatus.

2. The intelligent switch control system in claim 1, wherein the wireless control apparatus further comprises a switch control module to adjust a rotation angle of the rotary switch.

3. The intelligent switch control system in claim 2, wherein the mobile information apparatus further comprises a first network connection module; the mobile information apparatus is informationally connected to an internet through the first network connection module.

4. The intelligent switch control system in claim 3, wherein the wireless control apparatus further comprises a second network connection module; the wireless control apparatus is informationally connected to the internet and the mobile information apparatus through the second network connection module.

5. The intelligent switch control system in claim 1, wherein the first wireless transmission module and the second wireless transmission module are informationally connected to a wireless router respectively.

6. The intelligent switch control system in claim 1, wherein the mobile information apparatus and the wireless control apparatus are informationally connected to a wireless router respectively, so that the wireless control apparatus uploads the three-axis variation information to the server to store in the server.

7. The intelligent switch control system in claim 1, wherein the wireless control apparatus further comprises a temperature sensing module; the temperature sensing module detects an ambient temperature and sends a temperature information to the mobile information apparatus.

8. The intelligent switch control system in claim 1, wherein the mobile information apparatus further comprises a storage module informationally connected to the first micro-processing module; the storage module stores the switch status information.

9. The intelligent switch control system in claim 8, wherein the storage module stores a recipe data menu; the recipe data menu comprises a plurality of recipe option.

10. An intelligent switch control system implementation method, a wireless control apparatus of an intelligent switch control system assembled and arranged in a rotary switch of an equipment, the intelligent switch control system implementation method comprising: an apparatuses pairing step: executing a switch monitoring module of a mobile information apparatus, so that a first wireless transmission module of the mobile information apparatus is informationally connected to a second wireless transmission module of the wireless control apparatus in a signal receiving range to form a connection status; a switch status detecting step: when the mobile information apparatus is informationally connected to the wireless control apparatus, a second micro-processing module of the wireless control apparatus driving a sensing module, so that the sensing module detects the rotary switch to generate a three-axis variation information, and then the second micro-processing module sends the three-axis variation information to the first wireless transmission module of the mobile information apparatus through the second wireless transmission module; a switch status determining step: when the mobile information apparatus receives the three-axis variation information, the switch monitoring module analyzing the three-axis variation information and generating a switch status information; a wireless signal detecting step: the mobile information apparatus detecting the connection status with the wireless control apparatus, when the mobile information apparatus is in the signal receiving range, the intelligent switch control system repeating the switch status detecting step and the switch status determining step, when the mobile information apparatus is out of the signal receiving range, a switch status prompt step executed; and the switch status prompt step: when the mobile information apparatus is not able to detect the wireless control apparatus, the mobile information apparatus fetching a latest of the switch status information, when the switch status information is a turned-on status, the switch monitoring module informing the mobile information apparatus to send out an alert prompt.

11. The intelligent switch control system implementation method in claim 10, wherein the wireless control apparatus further comprises a switch control module to adjust a rotation angle of the rotary switch.

12. The intelligent switch control system implementation method in claim 10, wherein after the switch monitoring module receives a first of the three-axis variation information, according to the three-axis variation information, the switch monitoring module proceeds with a calibration procedure for the sensing module.

13. The intelligent switch control system implementation method in claim 11, wherein the mobile information apparatus further comprises a first network connection module; the wireless control apparatus further comprises a second network connection module; the first network connection module is informationally connected to the second network connection module through an internet.

14. The intelligent switch control system implementation method in claim 11, wherein the mobile information apparatus further comprises a storage module informationally connected to the first micro-processing module of the mobile information apparatus; the storage module stores a recipe data menu; a recipe option of the recipe data menu is chosen, and the mobile information apparatus sends a switch adjusting signal to the wireless control apparatus, so that the switch control module adjusts the rotation angle of the rotary switch according to the switch adjusting signal.

* * * * *